United States Patent

[11] 3,524,424

[72] Inventors Wesley J. Roland
 Sloan, New York;
 Ronald C. Voisard, Williamsville, New York
[21] Appl. No. 635,820
[22] Filed May 3, 1967
[45] Patented Aug. 18, 1970
[73] Assignee Automatic Sprinkler Corporation of America
 Cleveland, Ohio
 a Corporation of Ohio by mesne Assignment to

[54] LOW PRESSURE ALARM
 7 Claims, 2 Drawing Figs.
[52] U.S. Cl. .................................................. 116/70,
 73/557
[51] Int. Cl. ..................................................... G01l 19/12
[50] Field of Search .......................................... 116/65, 70,
 117, 67; 73/consulted 388; 128/142, 142.3, 145.8,
 141; 222/consulted 3; 137/557

[56] References Cited
UNITED STATES PATENTS
| | | | |
|---|---|---|---|
| 3,056,378 | 10/1962 | Simmonds..................... | 116/70 |
| 3,224,409 | 12/1965 | Fenger et al. ................. | 116/70 |
| 3,244,196 | 4/1966 | Replogle ...................... | 137/557 |

Primary Examiner— Louis J. Capozi
Attorney—Christel and Bean

ABSTRACT: A plunger is movable in a chamber having an outlet orifice, into and out of orifice closing relation. A spring biases the plunger in a direction to close the orifice. Pressure fluid from a line or container being sensed is admitted to the chamber at opposite ends of the plunger. The plunger ends are of unequal effective area, creating a fluid pressure differential urging the plunger into orifice closing position. When the fluid pressure drops to a predetermined level, the plunger moves away from the orifice, admitting pressure fluid to a chamber and against a piston normally closing the chamber outlet. The piston is driven against a bell, and uncovers a vent which exhausts the chamber faster than it is replenished through the orifice. The piston is seated, closing the chamber outlet, until the chamber pressure builds up to a level unseating the piston and driving it against the bell. This results in repeated striking of the bell under low pressure conditions.

Patented Aug. 18, 1970

3,524,424

INVENTOR.
Ronald C. Voisard
and Wesley J. Roland
BY Christel + Bean
ATTORNEYS.

3,524,424

LOW PRESSURE ALARM

BACKGROUND OF THE INVENTION

This invention relates to a warning device and more particularly to an improved fluid actuated warning device operable in response to a predetermined low pressure in a fluid line to provide a continuous, audible alarm signal.

It is often desirable to provide a warning device in a fluid supply line to indicate an insufficiency or near depletion of a fluid supply. For example, a warning device can be employed in a supply line to the breathing apparatus used by a person working in a toxic or oxygen deficient environment to signal to the user thereof that his fluid supply is nearly exhausted or insufficient. It is also desirable to provide such a signal while the user has sufficient time to leave the environment or obtain a fresh air supply for his breathing apparatus. Warning devices of this type, must therefore be accurately responsive to low pressures and be compact to provide unencumbering portability.

Prior art warning devices have included gauges which give visual indication of the fluid supply pressure but these require the continuous attention of the user thereby distracting him from his work if he remembers to watch the gauge. Other warning devices have employed whistles, which cannot always be distinguished from surrounding noises, or have been relatively complicated in construction. Still other devices are subjected to continous rubbing and wearing action between their seals and movable parts whereby particles can clog and block the relatively small fluid passages.

SUMMARY OF THE INVENTION

Accordingly, it is a primary object of the present invention to provide an improved warning device of simple construction which is automatically actuated in response to a predetermined pressure in a fluid supply line to provide an audible, clearly distinguishable alarm signal.

It is another object of the present invention to provide an improved warning device particularly suitable and adapted for actuation at a predetermined low pressure.

It is yet another object of the present invention to provide an improved warning device having the foregoing characteristics wherein the alarm is sounded continuously for pressures below the predetermined pressure and wherein the warning device utilizes negligible quantities of fluid from the supply line to actuate and continuously sound the alarm.

It is still another object of the present invention to provide an improved warning device having the foregoing characteristics wherein the parts are arranged to prevent clogging of their fluid passages.

It is a futher object of the present invention to provide an improved warning device having the foregoing characteristics and operable automatically to de-activate and reset the alarm in response to sensing pressure in the fluid supply line above the predetermined pressure.

It is yet a further object of the present invention to provide an improved warning device having the foregoing characteristics which is compact in size, easily and inexpensively manufactured and readily disposed in a fluid line.

In one aspect thereof, the low pressure alarm of the present invention is characterized by the provision of a chamber, orifice outlet from the chamber, a seat surrounding the orifice, a plunger movable in the chamber into and out of orifice closing relation, the plunger having a larger effective area on the end thereof remote from the orifice, means for establishing fluid communication between a fluid line and the chamber at opposite ends of the plunger, means biasing the plunger away from the seat to open the orifice, the fluid pressure differential across the plunger normally overcoming the biasing means to maintain the plunger in orifice closing position, an alarm, and pressure responsive means communicating with the orifice and operable to actuate the alarm.

Various other novel features of construction and advantages inherent in the low pressure alarm construction of the present invention are pointed out in the following detailed description of a typical embodiment thereof considered in conjunction with the accompanying drawing depicting the same wherein like numerals represent like parts throughout the various views and wherein:

DESCRIPTION OF THE PREFERRED EMBODIMENT

Figure 1:
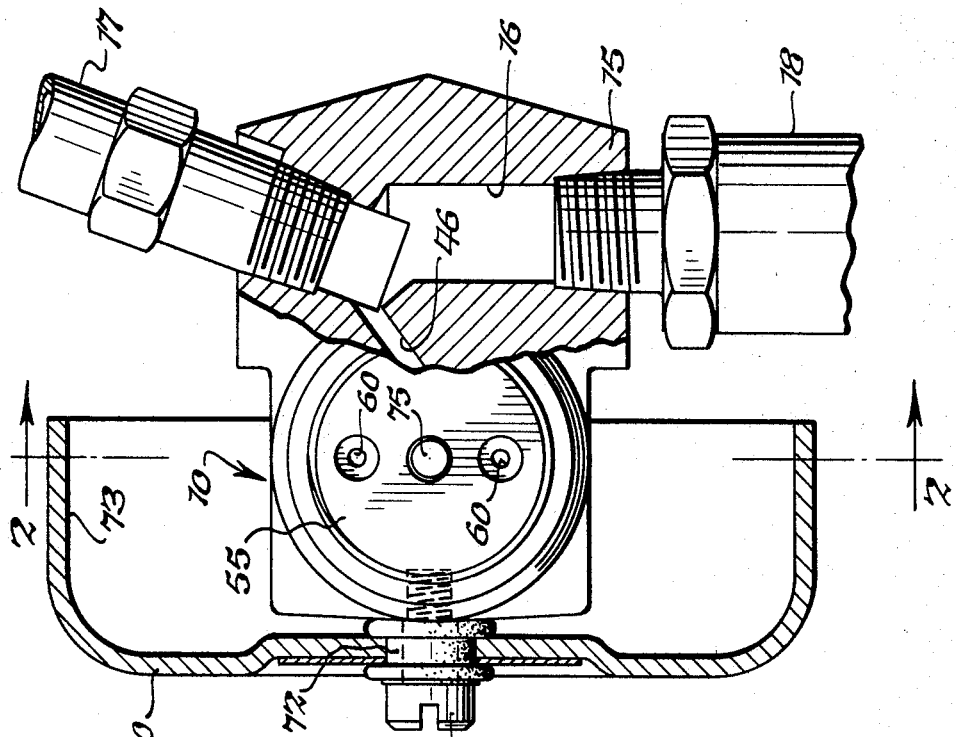
FIG. 1 is a view partly in elevation and partly in cross-section of a warning device constructed in accordance with the principles of the present invention.

Referring now to the drawing, there is shown one form of fluid actuated, low pressure warning device constructed in accordance with the present invention comprising a generally T-shaped body 10. The upper portion body 10 having an intermediate, laterally extending, stepped cylindrical bore 11 opening at its opposite ends through base portions of enlarged cylindrical recesses 12 and 13 formed in opposite ends of the upper portion of body 10. Lower portion 15 of body 10 (FIG. 1) has a laterally extending bore 16 threaded at its oppostie ends to receive conduits 17 and 18 which can form part of a pressurized fluid supply line and which can connect a fluid source, such as a pressurized tank or an industrial source, not shown, with a breathing apparatus also not shown such as worn by a person working in a toxic or oxygen deficient environment. The low pressure warning device of the present invention provides a continuous audible alarm whenever the fluid pressure being sensed drops below a predetermined pressure. In the above instance, it would provide warning to the wearer of the breathing apparatus that his fluid supply through line 17,18 is nearly exhausted, and that he should leave the environment or obtain another source of breathing fluid.

A retainer 20 threads into recess 12 and abuts a shoulder 21 having suitable annular packing 22 whereby retainer 20 seals bore 11 at one end thereof. A plate member 24 having a restricted central orifice 25 together with a surrounding annular seat 26 projecting slightly axially from one side thereof toward retainer 20 is seated in recess 13 and abuts a shoulder 27 having suitable annular packing 28 whereby bore 11 is sealed at its opposite end except for orifice 25. Bore 11, retainer 20 and plate member 24 thus define a stepped cylindrical chamber 29 in which a cylindrical plunger member, generally indicated 30, is slidably received. Plunger 30 has an enlarged, cylindrical piston head 31 slidably engaging corresponding diametrically enlarged portion 32 of chamber 30, a cylindrical intermediate body portion 33 extending axially from head 31 toward plate member 24 and slidably engaging a reduced diameter portion 34 of chamber 30 and a diametrically reduced stem 35 extending axially from portion 31 toward orifice 25. An annular seal 31' extends about head 31, and an annular seal 33' extends about body 33. Stem 35 has a resilient sealing end member 36 engageable against seat 26 to seal orifice 25 and prevent communication between chamber 29 and recess 13.

A tension spring 37 encircles stem 35 and engages plate member 24 and an annular shoulder 38 on intermediate portion 33 of plunger member 30 to bias the latter away from seat 26.

Plunger member 30 has an axial passage 41 communicating at one end with a diametrical passage 42 opening laterally into an annular cavity 43 disposed between stem 35 and reduced portion 34 of chamber 29. Axial passage 41 opens through the head 31 of plunger member 30 into a working cylindrical cavity 44 defined by enlarged portion 32 of chamber 29, the end face of plunger head 31 and the inner face 45 of retainer 20. A passage 46 communicates between bore 16 (FIG. 1) and cavity 43, for sensing the fluid pressure in line 18,17. Fluid under pressure is transmitted from lines 17,18 via passage 46 into cavity 43 and through passages 42 and 41 into cavity 44, whereby the fluid pressure being sensed acts against the opposite ends of plunger member 30. Plunger member 30 has been formed to provide a differential area against which the pressure fluid in cavities 43 and 44 is effective to slide plunger member 30 axially within chamber 29, with the fluid in cavity 44 acting against the larger area of the piston head end face providing a net pressure differential normally sufficient to overcome spring 37 and maintain plunger member 30 seated against seat 26, thereby closing orifice 25.

A cup-shaped member 50 is seated in recess 13 against the outer face of plate member 24. Member 50 has a central opening 51 formed with a surrounding annular seat 52 projecting slightly outwardly, and is sealed by a suitable peripheral packing ring 53 engaging wall of recess 13 to seal the cavity 54 formed with plate member 24. A retainer 55 having a reduced diameter sleeve portion 56 projecting axially inwardly threads into recess 13 with the end of sleeve portion 56 bearing against cup-shaped member 50 to maintain plate member 24 in sealed engagement against shoulder 27. A lateral vent passage 58, larger in area than orifice 25 for reasons to become apparent, extends through sleeve 56 and opens into a cavity 59 which exhausts through a plurality of circumferentially spaced openings 60 formed through retainer 55. Sleeve 56 is internally stepped, providing a chamber slidably receiving a striker generally indicated 61. Striker 61 comprises a piston 62 having a resilient sealing end portion 63 engageable against seat 52 and a diametrically reduced stepped stem 64 slidable through and axial opening in the end of retainer 55. Striker 61 is biased into sealing engagement against seat 52 by an encircling spring 66 which extends between a shoulder 67 on piston head 62 and an inwardly facing shoulder 68 on retainer 55.

A cup shaped bell 70 is secured to body 10 by a screw 71 engaging through a grommet 72 retained in a central opening of bell 70 and threading into the upper portion of body 10. A skirt portion 73 of bell 70 depends about the upper portion of body 10. Striker 61 is arranged so that its striking end 75 strikes skirt portion 73 to ring bell 70 and provide an audible signal or alarm while simultaneously piston head 62 uncovers vent 58.

In use, and assuming that fluid under normal pressure flows through line 17 and 18, the net fluid pressure differential on plunger member 30 is sufficient to maintain plunger member 30 seated against seat 26 against the bias of spring 27, whereby orifice 25 is closed. In this position, striker 51 is spaced from bell 70 and bears against seat 52 under the bias of spring 66.

When the fluid pressure in lines 17 and 18 drops below a predetermined level, which can be selected to reflect the insufficient pressure of a nearly exhausted supply tank or of a supply line, spring 37 overcomes the net pressure differential on plunger member 30, moving it away from seat 26 to open orifice 25 and provide direct communicating between lines 17 and 18 and cavity 54. As seat 26 is uncovered, the full area of the plunger seal 36 is exposed to the fluid pressure in cavity 43, thereby further reducing the pressure differential across plunger 30 and implementing the opening action of spring 37.

Figure 2:
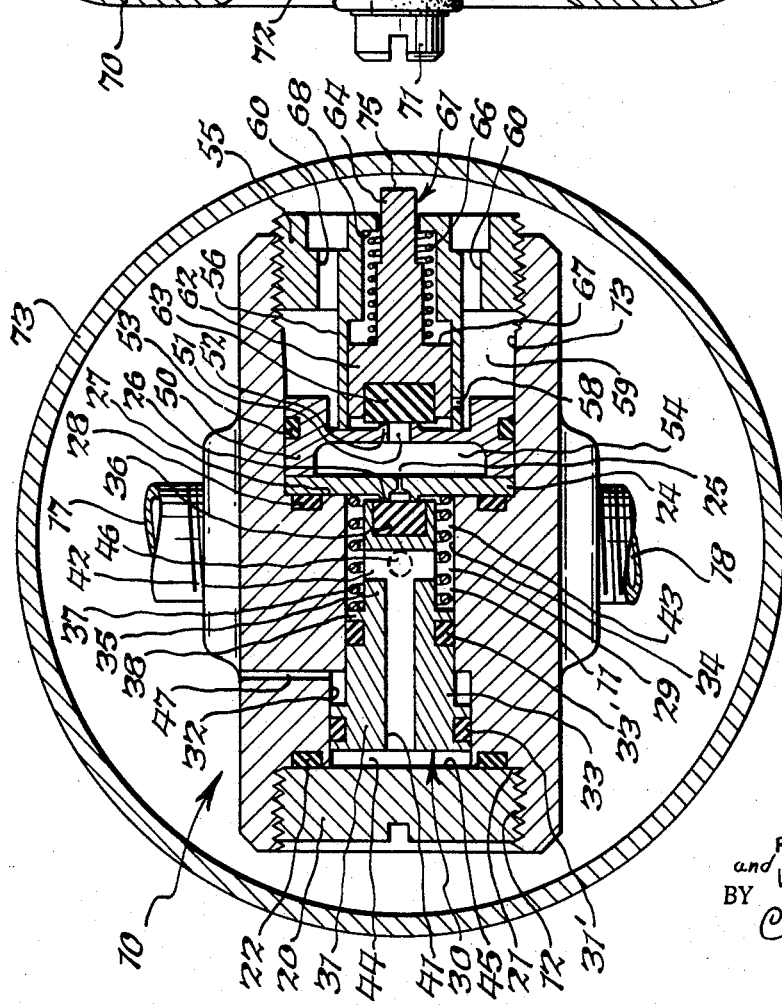
FIG. 2 is a cross sectional view thereof taken about on line 2-2 of FIG. 1.

Pressure in cavity 54 acts through opening 51 against the exposed area of striker seal 63, and when the cavity pressure builds up to a predetermined level it overcomes spring 66 whereupon striker 61 is moved outwardly toward skirt 73 of bell 70 and away from opening 51. When seal 63 unseats from seat 52, the entire end area of piston head 62 is exposed to the pressure in cavity 54 and striker 51 is driven against skirt 73 to ring bell 70. Simultaneously, piston head 62 uncovers vent 58 whereupon the fluid driving striker 61 exhausts into cavity 59 and through openings 60 to the ambient atmosphere. Since vent 58 has a greater area than orifice 25, the pressure in cavity 54 rapidly decreases when orifice 58 is uncovered with the result that spring 66 returns striker 61 against seat 52 with piston head 62 covering orifice 58. Orifice 25 remains open, whereupon the fluid pressure in cavity 54 builds up and again acts against striker 61 as described above, causing the same to strike bell 70. In this manner, striker 61 is reciprocated and strikes bell 70 repeatedly to provide a continuous ringing alarm so long as orifice 25 remains open. When the pressure in lines 17 and 18 rises above the predetermined pressure, for example by providing a fresh tank of fluid or connecting the lines with another supply line, the increased pressure is reflected in cavity 44 and acts against end face 45 of plunger member 30 to overcome the bias of spring 37 and slide plunger member 30 against seat 26, thereby closing orifice 25. Chamber portion 32 behind plunger head 31 is vented through a passage 47. The pressure fluid in cavity 54 will be exhausted through orifice 58 and spring 66 returns striker 61 to its normal seated position shown in FIG. 2. With orifice 25 closed, there is insufficient pressure in cavity 54 acting against striker 61 to overcome the bias of spring 66. Therefore, as long as a pressure above the predetermined pressure is maintained in lines 17 and 18, orifice 25 will remain closed and striker 61 is inoperative to sound bell 70.

Thus, it is seen that the objects of our invention are fully accomplished. There is provided a warning device which is compact and simply constructed, which is not subject to clogging, which is particularly adapted for low pressure operation, and which operates automatically in response to a predetermined low pressure to provide an audible alarm. Moreover, the foregoing warning device is automatically reset when the pressure in the supply line rises above the predetermined pressure.

Having thus described and illustrated one preferred form of our invention, it will be understood that such description and illustration is by way of example only and that such modifications and changes as may suggest themselves to those skilled in the art are intended to fall within the scope of the present invention as limited only by the appended claims:

We claim:

1. A warning device providing an alarm signal in response to a predetermined low pressure in a fluid line comprising means providing a chamber, means providing an orifice outlet from said chamber, a seat surrounding said orifice, a plunger movable in said chamber into and out of orifice closing relation to said seat, said plunger providing a larger effective area on the end thereof remote from said orifice than on the orifice end thereof, means for establishing fluid communication between a line being sensed and said chamber at opposite ends of said plunger, whereby said opposite ends of said plunger are subjected to fluid pressure corresponding to that in a line being sensed, means biasing said plunger away from said seat to open said orifice, the fluid pressure differential across said plunger overcoming said biasing means to maintain said plunger member against said seat whenever the pressure being sensed is above a predetermined level, said biasing means moving said plunger away from said seat to open said orifice when the pressure being sensed is below said level, an alarm, and pressure responsive means communicating with said orifice and being operable to actuate said alarm, a cavity communicating with said chamber through said orifice, a second chamber communicating with said cavity through an aperture larger than said orifice, a second seat surrounding said aperture within said second chamber, said pressure responsive means including a piston member slidable in said second chamber into and out of aperture closing relation against said second seat, and means biasing said piston member against said seat to close said aperture, said piston member having a relatively small effective area exposed to fluid pressure when biased against said seat and a relatively large effective area exposed to fluid pressure when said piston member is moved away from said seat.

2. A warning device according to Claim 1 wherein said communication establishing means includes a passage extending through said plunger member providing direct fluid communication between opposite ends thereof, and a fluid inlet opening into said chamber at one end of said plunger member.

3. A warning device according to claim 2 wherein said plunger member comprises a piston head and a diametrically reduced stem projecting from said piston head on the side thereof facing said orifice to engage said seat, said stem and said chamber defining an annular cavity, one end of said passage and said inlet opening into said cavity.

4. A warning device according to Claim 3 wherein said biasing means includes a spring encircling said stem and engaging said plunger to bias the latter away from said orifice.

5. A warning device according to Claim 1 wherein said chamber means includes a stepped cylindrical chamber with the larger diameter portion thereof remote from said orifice, said plunger member including an enlarged piston head slidable in said larger diameter chamber portion and the smaller diameter stem slidable in the smaller diameter chamber portion, biasing means including a spring engaging about said plunger stem to bias said plunger away from said orifice.

6. A warning device according to Claim 1 wherein said alarm includes a bell, and said piston member has a striker normally spaced from said bell, and fluid pressure means for reciprocating said piston member to repeatedly strike said bell when said orifice is open.

7. A warning device according to Claim 1 together with an exhaust opening through a side wall of said second chamber and spaced from said aperture, said piston member closing said opening when said aperture is closed, said alarm including a bell disposed in the path of movement of said piston member away from said aperture, said piston member being movable to strike said bell and uncover said opening to vent said second chamber and said cavity upon opening of said orifice and build-up of fluid pressure in said cavity, said piston member biasing means moving said piston member to close said opening and said aperture in response to venting of said cavity and said second chamber, whereby said piston member is reciprocated to continuously ring said bell.